United States Patent
Kwon et al.

(10) Patent No.: US 12,136,254 B2
(45) Date of Patent: Nov. 5, 2024

(54) METHOD AND APPARATUS WITH IMAGE PROCESSING

(71) Applicant: Samsung Electronics Co., Ltd., Suwon-si (KR)

(72) Inventors: Donghyuk Kwon, Seoul (KR); Minkyoung Cho, Icheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 17/159,653

(22) Filed: Jan. 27, 2021

(65) Prior Publication Data

US 2022/0067429 A1    Mar. 3, 2022

(30) Foreign Application Priority Data

Sep. 2, 2020   (KR) .................. 10-2020-0111842

(51) Int. Cl.
| | |
|---|---|
| *G06V 10/77* | (2022.01) |
| *G06N 3/04* | (2023.01) |
| *G06N 3/08* | (2023.01) |
| *G06T 3/40* | (2024.01) |
| *G06T 7/33* | (2017.01) |
| *G06V 10/94* | (2022.01) |

(52) U.S. Cl.
CPC .......... *G06V 10/7715* (2022.01); *G06N 3/04* (2013.01); *G06N 3/08* (2013.01); *G06T 3/40* (2013.01); *G06T 7/33* (2017.01); *G06V 10/955* (2022.01); *G06T 2207/20084* (2013.01)

(58) Field of Classification Search
CPC .......... G06F 18/213; G06N 3/04; G06N 3/08; G06T 3/40; G06T 7/33; G06T 2207/20084; G06V 10/955
See application file for complete search history.

(56) References Cited

U.S. PATENT DOCUMENTS

| | | | |
|---|---|---|---|
| 10,282,864 B1 * | 5/2019 | Kim ................. | G06N 3/084 |
| 10,380,753 B1 * | 8/2019 | Csordas et al. ........ | G06V 10/82 |
| 2009/0257621 A1 * | 10/2009 | Silver .................. | G06V 10/751 |
| | | | 382/103 |
| 2010/0183217 A1 | 7/2010 | Seung et al. | |
| 2019/0045168 A1 * | 2/2019 | Chaudhuri ............ | G06T 3/4053 |
| 2019/0094858 A1 * | 3/2019 | Radosavljevic ......... | G08G 1/14 |
| 2019/0096025 A1 | 3/2019 | Nystad et al. | |
| 2019/0171903 A1 | 6/2019 | Vajda et al. | |

(Continued)

FOREIGN PATENT DOCUMENTS

| | | |
|---|---|---|
| CN | 110543906 A | 12/2019 |
| CN | 110705702 A | 1/2020 |

(Continued)

OTHER PUBLICATIONS

Odena et al. "Deconvolution and checkerboard artifacts." *Distill* 1.10 (2016) (8 pages in English).

(Continued)

*Primary Examiner* — Qun Shen
(74) *Attorney, Agent, or Firm* — NSIP Law

(57) ABSTRACT

An Image processing method and apparatus are provided. The Image processing method includes obtaining a kernel that is deterministically defined based on an extension ratio of a first feature map, up-sampling the first feature map to a second feature map by performing a transposed convolution operation between the first feature map and the kernel, and outputting the second feature map.

42 Claims, 12 Drawing Sheets

(56) References Cited

U.S. PATENT DOCUMENTS

| | | | |
|---|---|---|---|
| 2019/0295228 A1* | 9/2019 | Liu | ............... G06N 20/10 |
| 2019/0306526 A1 | 10/2019 | Cho et al. | |
| 2020/0012940 A1 | 1/2020 | Liu et al. | |
| 2020/0134833 A1* | 4/2020 | Biswas | ............... G06N 5/046 |
| 2020/0151497 A1* | 5/2020 | Kojima | ............... G06T 7/11 |
| 2020/0244971 A1* | 7/2020 | Wang | ............... H04N 19/523 |
| 2020/0258300 A1* | 8/2020 | Schwarz | ............... G06T 7/11 |
| 2021/0279880 A1* | 9/2021 | Giner | ............... G06T 7/168 |
| 2021/0358082 A1* | 11/2021 | Zhu | ............... G06N 3/045 |

FOREIGN PATENT DOCUMENTS

| | | | | |
|---|---|---|---|---|
| CN | 110853011 A | 2/2020 | | |
| EP | 3 557 485 A1 | 10/2019 | | |
| GB | 2555136 A | * 4/2018 | ......... | G06K 9/00744 |
| KR | 10-1612315 B1 | 4/2016 | | |
| KR | 10-1780057 B1 | 9/2017 | | |
| KR | 10-2069100 B1 | 1/2020 | | |
| WO | WO 2018/170393 A2 | 9/2018 | | |

OTHER PUBLICATIONS

Niklaus et al. "Video frame interpolation via adaptive separable convolution." *Proceedings of the IEEE International Conference on Computer Vision.* 2017 (10 pages in English).

Kuan Wei "Understand Transposed Convolutions" *TowardsDataScience.com* Jul. 16, 2021 (24 pages in English).

European Search Report issued on Jul. 26, 2021 in counterpart European Patent Application No. 21160458.2 (10 pages in English).

\* cited by examiner

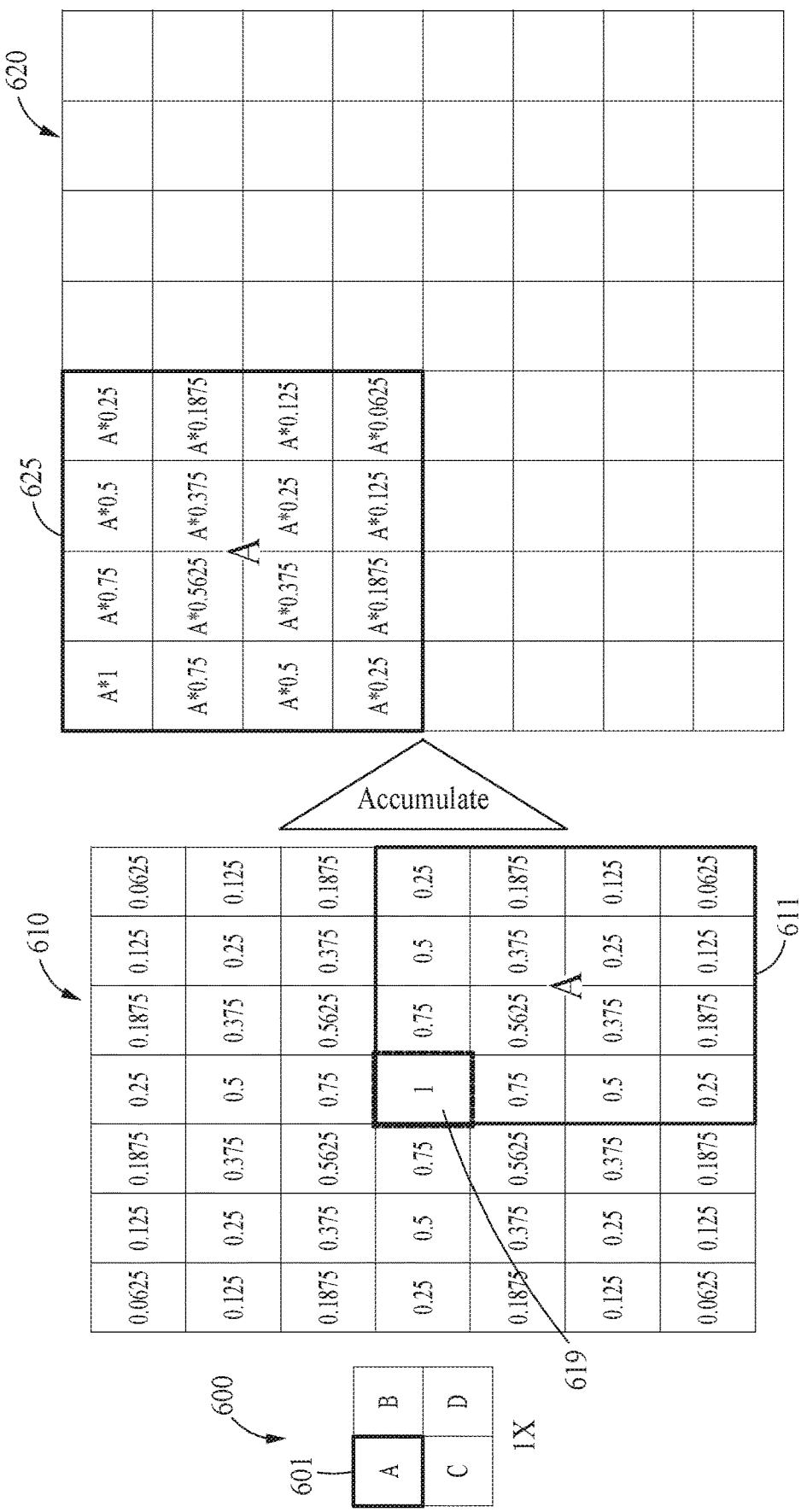

METHOD AND APPARATUS WITH IMAGE PROCESSING

CROSS-REFERENCE TO RELATED APPLICATIONS

This application claims the benefit under 35 USC § 119(a) of Korean Patent Application No. 10-2020-0111842, filed on Sep. 2, 2020, in the Korean Intellectual Property Office, the entire disclosure of which is incorporated herein by reference for all purposes.

BACKGROUND

1. Field

The following description relates to a method and apparatus with image processing.

2. Description of Related Art

Typically, CNNs have a structure of a recognizer that combines features of multiple concepts while reducing a size of an output feature map compared to the input feature map. Additionally, the form of the final output after one or more layers of the CNN may vary. An operation of enlarging the output feature map, e.g., having been reduced by performed convolution on the input feature map, may be implemented in various application fields, for example, image recognition, object detection, or image segmentation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes obtaining a kernel that is deterministically defined based on an extension ratio of a first feature map, up-sampling the first feature map to a second feature map by performing a transposed convolution operation between the first feature map and the kernel, and outputting the second feature map.

The outputting of the second feature map may include inputting the second feature map to a neural network layer configured to perform another transposed convolution operation between the second feature map and a select kernel that is deterministically defined based on an extension ratio of the second feature map.

The image processing method may be a method of an image processing device that includes a neuro processing unit that performs the up-sampling of the first feature map to the second feature map without performing an interpolation using an external information provider.

The kernel may include weights that vary dependent on a distance between a central pixel of the kernel and pixels neighboring the central pixel.

The weights may be inversely proportional to the distance between the central pixel and the neighboring pixels.

The kernel may have a size greater than the first feature map

A size of the kernel, a stride parameter of the transposed convolution operation, and a padding parameter of the transposed convolution operation may be determined based on the extension ratio.

The size of the kernel, the stride parameter of the transposed convolution operation, and the padding parameter may be kernel parameters, and the performing of the transposed convolution operation may include performing the transposed convolution operation using a neural network layer configured according to the kernel parameters and input the first feature map.

The size of the kernel, the stride parameter of the transposed convolution operation, and the padding parameter of the transposed convolution operation may be determined based on an interpolation scheme in addition to the extension ratio.

The method may further include selectively performing between one of the obtaining of the kernel and the up-sampling by the performing of the transposed convolution, and using an external information provider to perform interpolation according to the interpolation scheme to generate the second feature map.

Pixel alignment information of the second feature map may be predetermined, and the method may further include determining whether there will be pixel alignment between the first feature map and the second feature map based on the pixel alignment information of the second feature map, and the method may still further include, dependent on a result of the determining of whether there will be pixel alignment, selectively performing between one of the obtaining of the kernel and the up-sampling by the performing of the transposed convolution, and using an external information provider to perform interpolation according to the interpolation scheme to generate the second feature map.

The first feature map may include a plurality of channels, and the transposed convolution operation may be a depth-wise transposed convolution operation between the channels and the kernel.

The first feature map may include quantized activation values, and the kernel may include quantized weights.

The kernel may include a transposed convolution kernel matrix obtained by converting a weight multiplied by a first value of a first pixel of the first feature map into a parameter through a quantization, to convert the first value into a second value of a second pixel of the second feature map corresponding to a position of the first pixel.

The extension ratio may be determined so that a size of the first feature map and a size of the second feature map satisfy a predetermined integer ratio.

The first feature map may be an output feature map of a previous convolutional neural network layer in a neural network that is input an original image, or an output up-sampled feature map of a transposed convolution neural network layer in the previous layer in the neural network.

In one general aspect, embodiments include non-transitory computer-readable storage media storing instructions that, when executed by a processor, cause the processor to perform one or more or all operations and methods described herein.

In one general aspect, an image processing apparatus includes one or more processors configured to obtain a kernel that is deterministically defined based on an extension ratio of a first feature map, and up-sample the first feature map to a second feature map through performance of a transposed convolution operation between the first feature map and the kernel.

The one or more processors may be configured to perform the transposed convolution operation using a neural network layer, configured according the kernel and kernel parameters, input the first feature map.

The kernel parameters may include a size of the kernel, a stride parameter of the transposed convolution operation, and a padding parameter.

The one or more processors may include a neural processing unit configured to perform the up-sampling of the first feature map to the second feature map without performing an interpolation using an external information provider.

The kernel may include weights that vary dependent on a distance between a central pixel of the kernel and pixels neighboring the central pixel.

The weights may be inversely proportional to the distance between the central pixel and the neighboring pixels.

The kernel may have a size greater than the first feature map.

A size of the kernel, a stride parameter of the transposed convolution operation, and a padding parameter of the transposed convolution operation may be determined based on the extension ratio.

The size of the kernel, the stride parameter of the transposed convolution operation, and the padding parameter may be kernel parameters, and the one or more processors may be configured to perform the transposed convolution operation using a neural network layer configured according to the kernel parameters and input the first feature map.

The size of the kernel, the stride parameter of the transposed convolution operation, and the padding parameter of the transposed convolution operation may be determined based on an interpolation scheme in addition to the extension ratio.

Pixel alignment information of the second feature map may be predetermined, the one or more processors may be further configured to determine whether there will be pixel alignment between the first feature map and the second feature map based on the pixel alignment information of the second feature map, and dependent on a result of the determining of whether there will be pixel alignment, the one or more processors may perform the transposed convolution using a neural network layer, or perform interpolation according to the interpolation scheme to generate the second feature map.

The first feature map may include a plurality of channels, and the transposed convolution operation may be a depth-wise transposed convolution operation between the channels and the kernel.

The first feature map may include quantized activation values, and the kernel may include quantized weights.

The kernel may include a transposed convolution kernel matrix obtained by converting a weight multiplied by a first value of a first pixel of the first feature map into a parameter through a quantization, to convert the first value into a second value of a second pixel of the second feature map corresponding to a position of the first pixel.

The extension ratio may be determined so that a size of the first feature map and a size of the second feature map satisfy a predetermined integer ratio.

The first feature map may be an output feature map of a previous convolutional neural network layer in a neural network that is input an original image, or an output up-sampled feature map of a transposed convolution neural network layer in the previous layer in the neural network.

The apparatus may further include a hardware accelerator configured to dynamically generate the kernel based on the extension ratio.

The image processing apparatus may be a head-up display (HUD) device, a three-dimensional (3D) digital information display (DID), a navigation device, a 3D mobile device, a smartphone, a smart television (TV), or a smart vehicle.

In one general aspect, an apparatus includes one or more processors, including a CPU, a GPU, and neuro processor, wherein the neural processor is configured to implement a neural network through respective performances of plural convolutional layers, obtain a kernel that is deterministically defined based on an extension ratio of a first feature map generated by one of the plural convolutional layers, up-sample the first feature map to a second feature map through performance of a transposed convolution operation between the first feature map and the kernel.

The apparatus may further include a hardware accelerator configured to dynamically generate the kernel, based on the extension ratio, and provide the kernel to the neural processor.

The neural network may include a neural network layer that is input the second feature map.

Other features and aspects will be apparent from the following detailed description, the drawings, and the claims.

BRIEF DESCRIPTION OF THE DRAWINGS

FIGS. 5A to 5D illustrate examples of a process of performing a transposed convolution operation using a kernel corresponding to channels of a first feature map.

Figure 1:
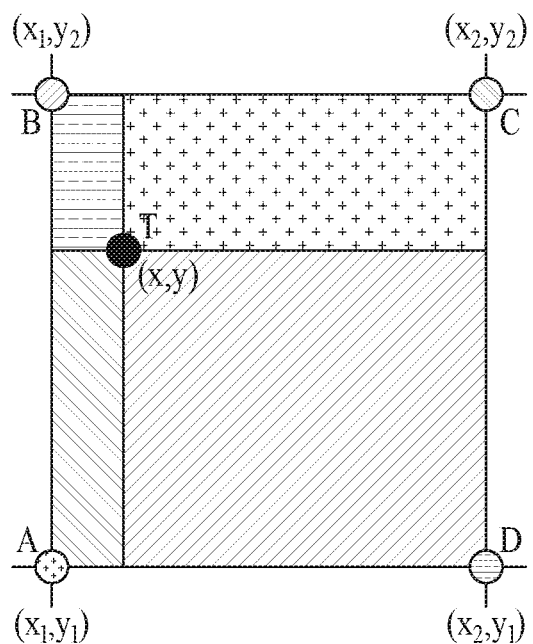
FIG. 1 illustrates an example of an interpolation operation used to enlarge a feature map.
Figure 1:
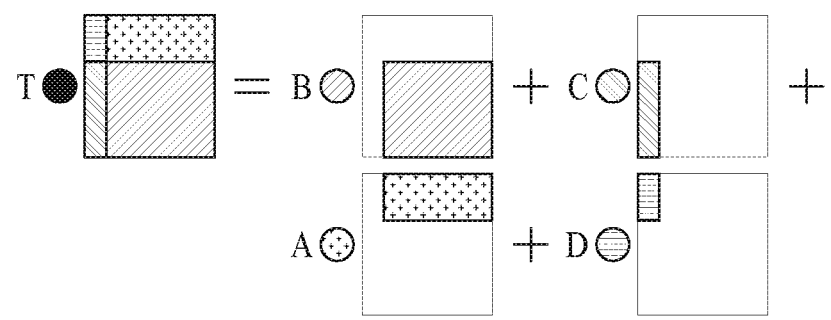

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the examples is not limited to the descriptions provided in the present specification. The examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, operations, elements, and/or components, but do not preclude the presence or addition of one or more other features, integers, operations, elements, components and/or groups or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the examples with reference to the accompanying drawings, like reference numerals refer to like constituent elements and a repeated description related thereto will be omitted. Also, in the description of example embodiments, detailed description of structures or functions that are thereby known after an understanding of the disclosure of the present application will be omitted when it is deemed that such description could cause ambiguous interpretation of the example embodiments. Examples will be described in detail with reference to the accompanying drawings, and like reference numerals in the drawings refer to like elements throughout.

Also, the terms "first," "second," "A," "B," "(a)," "(b)," and the like may be used herein to describe components according to examples. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be 'directly' connected, coupled or joined to the second component.

Unless otherwise described, components, features, or other aspects and corresponding description made or presented in one example may be applicable, applied, or included to another example, and thus, duplicated detailed descriptions explaining the same may be omitted.

FIG. 1 illustrates an example of an interpolation operation used to enlarge a feature map. FIG. 1 illustrates a concept of a bilinear interpolation (BI) operation as an example of the interpolation operation.

As a non-limiting example, a convolutional neural network (CNN or ConvNet) may be used in deep learning, which is a type of machine learning by which a neural network model is trained or has learned to directly filter or classify, for example, images, videos, text or sound, as non-limiting examples. The CNN may use a convolution operation, and may be useful to find a pattern to recognize an object or a face or a scene from an image, for example.

In an example, the CNN may perform the convolution operation through the traversing of a filter with respect to data or pixels of an input image at regular intervals, for example, to extract a feature of the image, and may generate a feature map or an activation map based on a result of the convolution operation. For example, the filter may also be referred to as a kernel and include a common parameter or weight parameters to extract a feature from the image. The filter may be referred to as a "kernel" that will be described below. Example regular intervals at which a filter moves or traverses data or pixels of the input image when the filter is applied to the input image may be referred to as "strides". For example, when a stride for such a traversal is "2", a convolution operation may be performed by applying the filter to the data or pixels of the input image at every two steps of information, which may be expressed as "stride parameter=2".

For example, with the CNN example, the output of each of one or more layers of the CNN may be respectively referred to as a "feature map". A feature map may also represent a filtering or compressing of information of the original image through a convolution operation. Such outputs of the CNN or outputs of respective layers of the CNN may be represented in a form of, for example, a vector, a matrix, or volume, as non-limiting examples. Such outputs may also represent an activation map, as a result obtained by applying an activation function to the results of the convolution. In other words, the respective final output results of convolution layers that perform the convolution operation in the CNN may also be referred to as activation maps.

For example, an output from a layer of the CNN, or a final output of the CNN, may depend on, for example, the different sizes of the applied filters or kernels, different strides of those applications, whether padding was been applied, and/or different sizes of max pooling that may be performed in the CNN. In a convolution layer, a size of the generated feature map may be less than that of input data due to the filter or kernel sizes and the corresponding stride.

The term "padding" may be construed as a filling or addition of an outer portion of data with the same number of predetermined values as a designated number of pixels (for example, "2"). For example, when padding is set to "2", upper, lower, left and right outer portions of input data having an original size of 32×32 may be filled or added with predetermined values, for example, "0", by two pixels. Thus, the ultimate data that may be input to the example convolutional layer may have a size of 36×36 when the padding is set to "2". This example may be expressed as "padding parameter=2". As demonstrated here, and described above, a size of the output data of a convolution layer may also be adjusted through padding.

In the following description, the term size may correspond to a size in pixel units, and may be construed as a size in pixel units unless specifically mentioned otherwise.

For example, when padding is not used with respect to the input data, the spatial size of the generated feature data may be decreased, compared to the spatial size of the input data, every time respective input data passes through a convolution layer, and accordingly information of edges of the data may disappear. The padding may be used to prevent the information of the edges of the data from disappearing, or to set an output of the convolution layer to be equal to a spatial size of input data.

For example, when information is reduced, filtered, or compressed by passing through one or more convolution layers, for example, when image segmentation is performed using a CNN, an interpolation operation may be used to enlarge the reduced, filtered, or compressed information. For example, an interpolation operation may be construed as an operation of generating new pixel values by analyzing existing neighboring pixels, e.g., adjacent pixels in a first sized image or feature map output by an example convolutional layer, that can be separately arranged in a larger second sized image or feature map in the subsequent performance of the interpolation, which may then interpolate the pixel values of the hole pixels, i.e., the respective newly generated pixels between the neighboring pixels that have been arranged in the larger second sized image or feature map.

A bilinear interpolation operation, as an example of the interpolation operation, may be an operation of calculating a value of a hole pixel as a geometric mean of the neighboring pixels arranged in the larger second sized image or feature map, closest to the hole pixel.

For example, a pixel value of a target ('hole') pixel T (x,y) may be determined by interpolation in the rectangle of FIG. 1 based on a geometric mean of the distance based influences of the respective pixel values of the example four neighboring pixels A, B, C, and D at that target pixel T.

For example, the values of the neighboring pixels A, B, C and D close to the target pixel T may each be multiplied by a respective weight that is inversely proportional to the distance between the target pixel T and each of the neighboring pixels A, B, C and D, as shown in Equation 1 below, for example, with the value of the target pixel T being the summation result of the respective multiplications. Thus, an interpolation value of the target pixel T may be determined.

$$f(x, y) \approx \frac{f(x_1, y_1)}{(x_2 - x_1)(y_2 - y_1)}(x_2 - x)(y_2 - y) + \\ \frac{f(x_2, y_1)}{(x_2 - x_1)(y_2 - y_1)}(x - x_1)(y_2 - y) + \\ \frac{f(x_1, y_2)}{(x_2 - x_1)(y_2 - y_1)}(x_2 - x)(y - y_1) + \\ \frac{f(x_2, y_2)}{(x_2 - x_1)(y_2 - y_1)}(x - x_1)(y - y_1)$$

Equation 1

For example, when an area of a maximum space of the rectangle of FIG. 1 in which the target pixel T may be present is "$(x_2-x_1) \times (y_2-y_1)$", a geometric mean value corresponding to spaces other than a space occupied based on the distance between the target pixel T and each of the neighboring pixels A, B, C and D in the area may be assigned as a weight corresponding to the distance between the target pixel T and each of the neighboring pixels A, B, C and D. As respective distances between each of the target pixels T and one or more of the neighboring pixels A, B, C and D decreases, corresponding weights to be assigned with respect to the influence of the one or more neighboring pixels may increase. Likewise, as respective distances between each of the target pixels T and one or more of the neighboring pixels A, B, C and D increases, corresponding weights to be assigned with respect to the influence of the one or more neighboring pixels may decrease. Through this process the respective pixel values of all of the target (or 'hole') pixels may be determined, and thus, the interpolation result will include each of the neighboring pixels A, B, C and D and the respectively determined target pixels. In the example of FIG. 1, below the rectangle of FIG. 1, demonstrating the maximum space of the interpolated feature map, FIG. 1 further demonstrates the example that the pixel value for the target pixel T is based on the weightings or influences of each of the pixel values of the neighboring pixels A, B, C and D, e.g., demonstrating that the value of the target pixel T will depend most on the value of the neighboring pixel B, with a lesser influence of the value of the neighboring pixel A, a still lesser influence of the value of the neighboring C, and a lowest influence from the value of the neighboring D.

Because such bilinear interpolation operations are not performed through convolution or matrix multiplication operations, which are performed in convolutional layers of a CNN, bilinear interpolation operation would not efficiently be performed using a corresponding dedicated hardware CNN-based processing unit, e.g., a neural processing unit (NPU) or other hardware accelerator that may be configured to perform many individual multiple accumulate (MAC) operations, for example.

For example, in an example of a CNN-based processing unit, which is instructed or tasked to perform convolution operation(s), when the bilinear interpolation operation is performed, e.g., for up-sampling an output feature map of a first neural network layer before input to a second neural network layer, a typical CNN-based processing unit must implement a corresponding bilinear interpolation operation using an external information provider (IP), for example, a graphics processing unit (GPU) or a central processing unit (CPU), and thus, an overhead may occur or a processing speed may decrease due to the data transmission to the external IP.

In one or more examples, an example CNN-based processing unit or other hardware accelerator, as non-liming examples, of one or more embodiments may generate the output feature map by implementing the first neural network layer, and then provide the output feature map to an implemented neural network layer configured to perform a transposed convolution operation to generate the up-sampled output feature map, which is then input to the second neural network layer, and thus, the performance of a corresponding CNN, for example, may not suffer from such overhead or decreases in processing speeds, e.g., as a bilinear interpolation operation using an external information provider (IP) is not necessary for this up-sampling. For example, a neural network configured to perform a transposed convolution operation of the example input feature map having only neighboring pixels A, B, C, and D of FIG. 1 may implement the neural network using a kernel having weights and parameters determined for the input feature map and dependent on information of the desired up-sampled feature map, with all resulting values of all of the target pixels T, output by this neural network.

Figure 2:
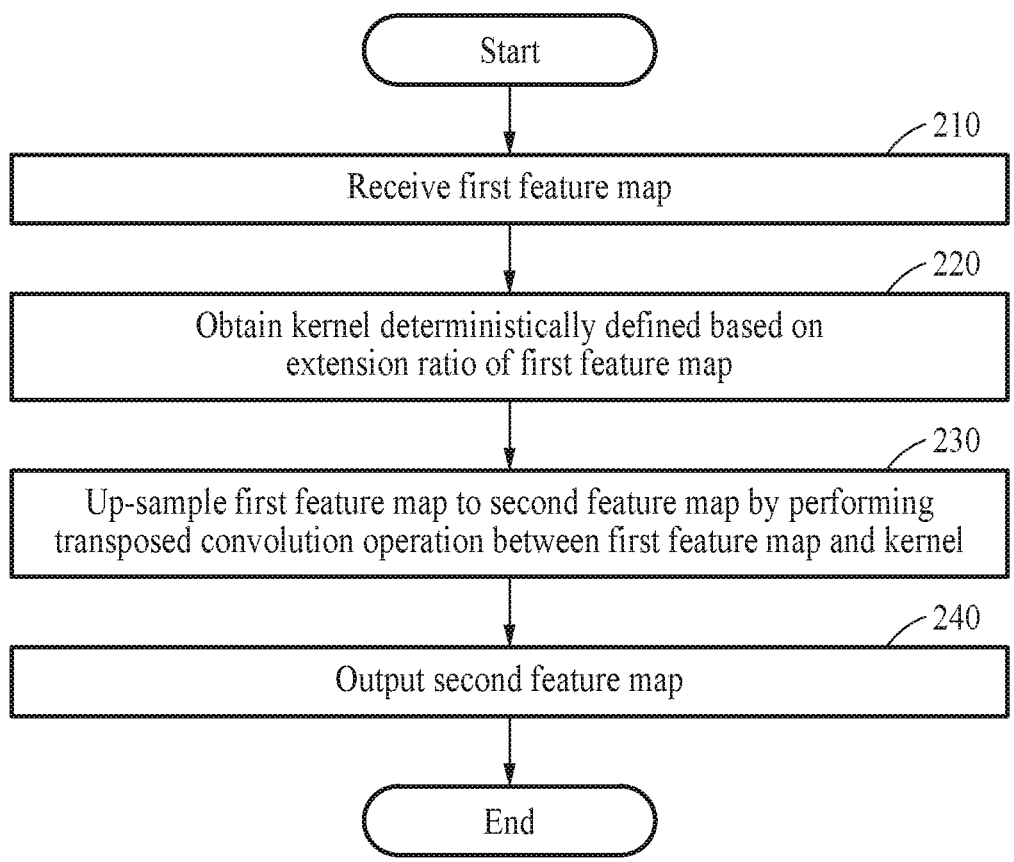
FIG. 2 illustrates an example of an image processing method.

FIG. 2 illustrates an example of an image processing method, according to one or more embodiments. Referring to FIG. 2, in operation 210, an image processing apparatus receives a first feature map. The first feature map may be, for example, a feature map obtained by compressing or filtering information of an original image through a convolution operation in a previous layer of a neural network, or a feature map that was up-sampled through a transposed convolution operation in the previous layer of the neural network. The neural network may be, for example, a CNN, and a layer may be, for example, a convolution layer that performs a convolution operation. The first feature map may include quantized activation values. For example, when an input image is a color image, each pixel of a feature map may have a value corresponding to each of three colors, that is, red (R), green (G) and blue (B) to represent natural colors, and accordingly the first feature map may include three channels, one for each color. In another example, when the input image is a black-and-white or gray-scale image, and when a feature map represents a contrast or intensity only, the first feature map may include a single channel.

In operation 220, the image processing apparatus obtains a kernel that is deterministically defined based on an extension ratio of the first feature map received in operation 210. The extension ratio may also be referred to as a "size ratio" in that the extension ratio corresponds to a ratio of a size of a second feature map to a size of the first feature map. The extension ratio may be determined so that the size of the first feature map and the size of the second feature map may satisfy a predetermined integer ratio.

The "deterministically defining of the kernel based on the extension ratio of the first feature map" may be construed as defining, generating, or selecting a kernel corresponding to the extension ratio of the first feature map when the extension ratio is determined or predetermined.

The kernel may include quantized weights. For example, the kernel may include a transposed convolution kernel matrix obtained by converting a weight multiplied by a first value of a first pixel of the first feature map into a parameter through a quantization, to convert the first value into a second value of a second pixel of the second feature map corresponding to a position of the first pixel.

For example, the kernel may include weights that are dependent on respective distances between a central pixel of the kernel and pixels neighboring the central pixel, e.g., all remaining pixels, as shown in a kernel 610 of FIGS. 5A to 5D. In this example, the central pixel may correspond to a pixel, for example, a pixel at (4, 4) of the kernel 610, located in a central portion of the kernel 610, and the neighboring pixels may correspond to pixels other than the central pixel in the kernel 610. The weights may be inversely proportional to a distance between the central pixel and the neighboring pixels. For example, when a weight of the central pixel is set to "1", and when the distance between the central pixel and the neighboring pixels increases, for example, when a distance value increases, the weights of the corresponding neighboring pixels may gradually decrease to be "0.75", "0.5", or "0.25", for example.

In operation 230, the image processing apparatus up-samples the first feature map to the second feature map by performing a transposed convolution operation between the first feature map and the kernel obtained in operation 220. The transposed convolution operation may correspond to, for example, an operation of accumulating values calculated by multiplying the kernel by each pixel of the first feature map. The kernel may perform the transposed convolution operation while traversing the first feature map at designated intervals. In this example, the designated intervals may correspond to the above-described "strides". For example, when a stride is set to "2", the kernel may perform the transposed convolution operation while moving in the first feature map by two pixels.

When the first feature map includes a plurality of channels, the image processing apparatus may up-sample the first feature map to the second feature map by performing a depth-wise transposed convolution operation or a group transposed convolution operation between the kernel and each of the plurality of channels in operation 230. An example in which the image processing apparatus performs the transposed convolution operation will be further described below with reference to FIGS. 3 through 5D.

In operation 240, the image processing apparatus outputs the second feature map obtained in operation 230.

Figure 3:
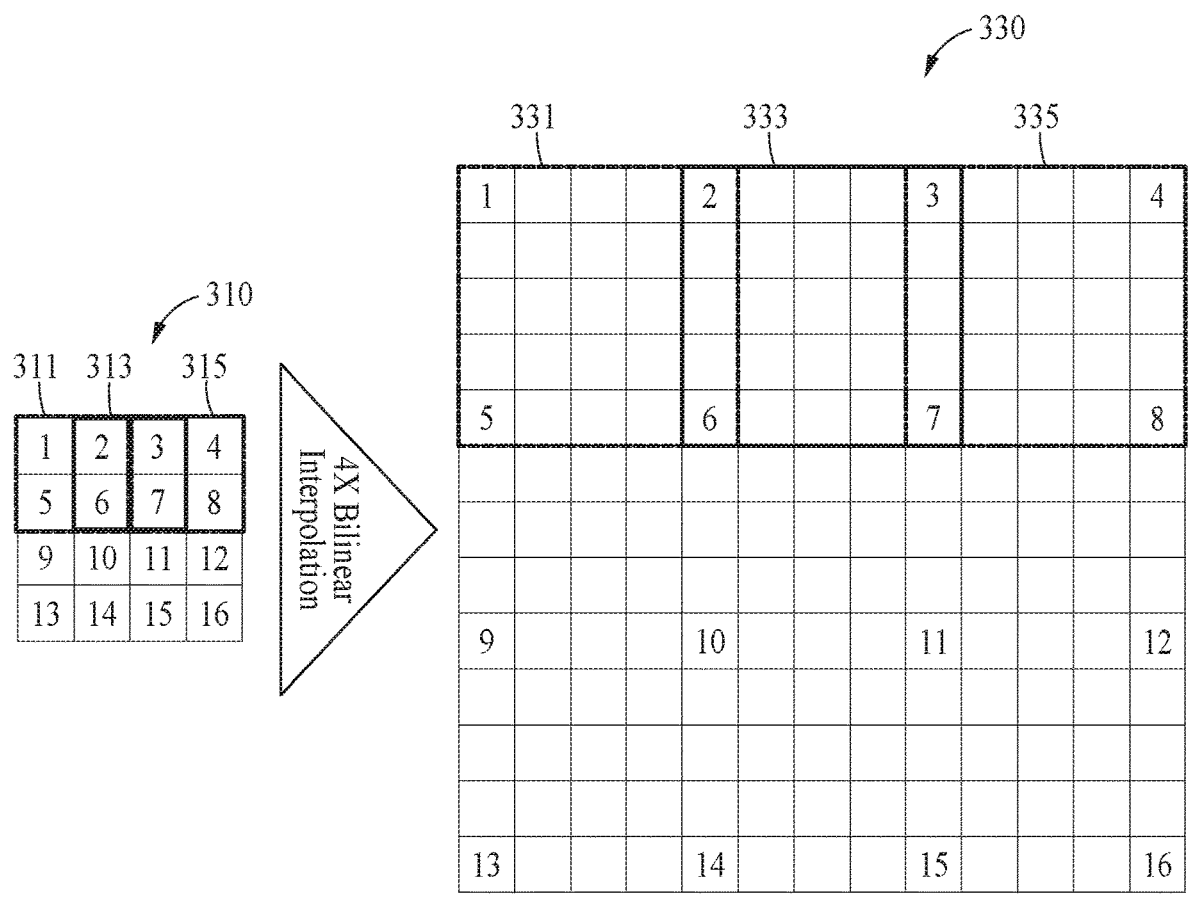
FIGS. 3 and 4 illustrate examples of a bilinear interpolation operation and a transposed convolution operation.
Figure 4:
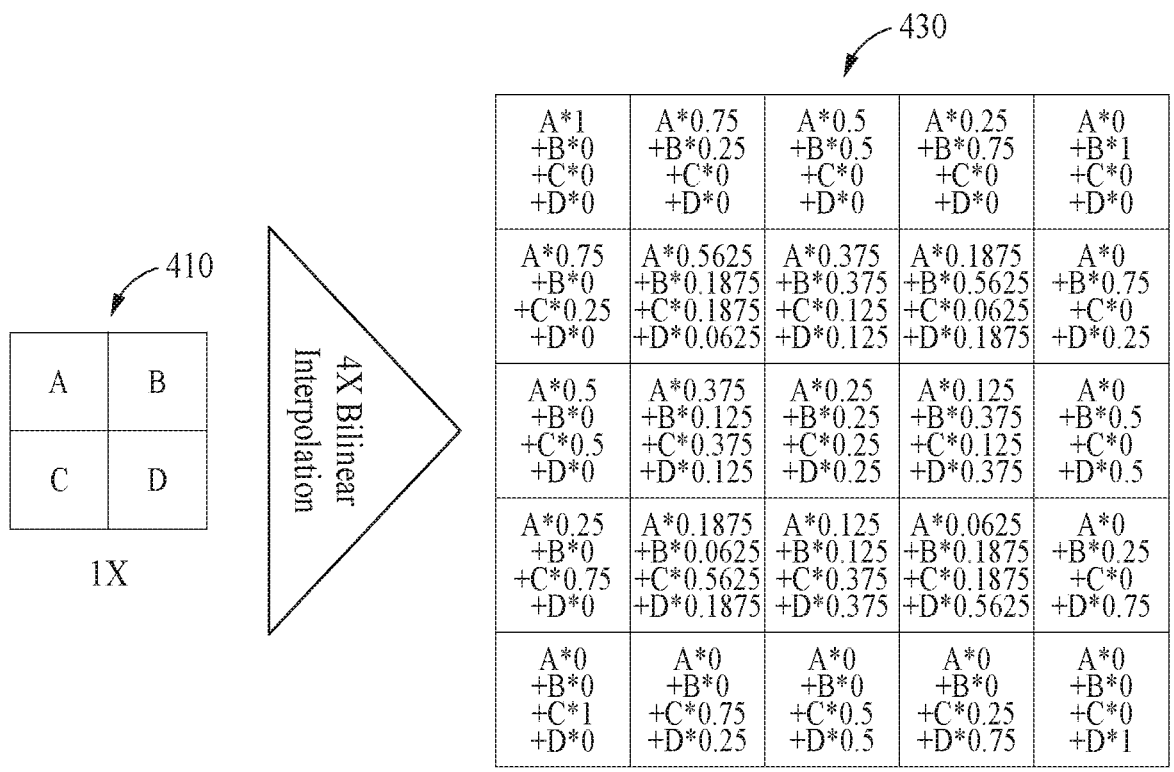

FIGS. 3 and 4 illustrate examples of a bilinear interpolation operation and a transposed convolution operation. With respect to FIG. 3 an output feature map 330 larger than the input feature map 310 by four times could be generated for the input feature map 310 through a bilinear interpolation operation, and as explained further below the output feature map 330 may also be implemented though an example transposed convolution. In the example of FIG. 3, it is assumed that a stride parameter is "4", a padding parameter is "3" and an extension ratio is "4".

According to the example stride of "4", four pixels 311 corresponding to 1, 2, 5, 6 in the input feature map 310 may be arranged as in a block 331 of the output feature map 330. Also, according to the stride, four pixels 313 corresponding to 2, 3, 6, 7 in the input feature map 310 may be arranged as in a block 333 of the output feature map 330, and four pixels 315 corresponding to 3, 4, 7, 8 in the input feature map 310 may be arranged as in a block 335 of the output feature map 330.

To fill the hole pixels of the output feature map 330, rather than the above-described bilinear interpolation (BI), any of various other interpolation schemes may be implemented to fill the hole pixels of the output feature map 330, for example, a nearest-neighbor interpolation scheme, a mean value interpolation scheme, or a bicubic interpolation scheme.

In an example, the nearest-neighbor interpolation scheme may fill hole pixels (for example, a left pixel or a right pixel of a hole pixel) directly neighboring a hole pixel with a value of the hole pixel, by performing an interpolation of values of the hole pixels in an x-axis direction and then performing an interpolation of values of the hole pixels in a y-axis direction. In an example, the mean value interpolation scheme may fill a hole pixel using a mean value of neighboring pixels, as the value of the hole pixel. In an example, the bicubic interpolation scheme may calculate data at an arbitrary position of an output from adjacent pixels in an input and fill a hole pixel with the data, as the value of a hole pixel, when geometry information between the input and the output changes due to a change, for example, rotation or enlargement of an image.

While an example of filling a space of a hole pixel of the output feature map 330 is described using the bilinear interpolation scheme, this description of the bilinear interpolation scheme is presented merely for convenience of explanation, and embodiments are not limited thereto. Examples include various interpolation schemes other than the bilinear interpolation scheme being used.

In an example in which the geometric mean is used as described above with respect to the performance of the bilinear interpolation, when pixels of the input feature map 310 and pixels of the output feature map 330 are accurately aligned, that is, when a size ratio between the input feature map 310 and the output feature map 330 satisfies a predetermined integer ratio, a weight multiplied by each of the pixels may be repeated. In this example, whether the size ratio between the input feature map 310 and the output feature map 330 satisfies the predetermined integer ratio may be determined based on whether the size ratio between the input feature map 310 and the output feature map 330 satisfies Equation 2, for example, shown below.

Output Size={Input Size}*{Extension Ratio (Integer)}−[{Extension Ratio}−1]  Equation 2:

Equation 2 may be simplified as:

Output size=(Input size−1)*Extension Ratio+1

For example, in FIG. 3, the input feature map 310 has a size of "4", the extension ratio is "4", and the output feature map 330 has a size of "13". Thus, the size ratio between the input feature map 310 and the output feature map 330 may satisfy "13=4×4−[4−1]" according to the example of Equation 2.

In an example, when the size ratio between the input feature map 310 and the output feature map 330 satisfies Equation 2, a weight multiplied by a pixel of the input feature map 310 is uniformly repeated.

Considering this uniform repetition, a transposed convolution operation using a neural network, for example, is demonstrated herein as also achieving the same results, though through the different convolutional process and with greater speed and efficiency. In addition, the above Equation 2 can also be used to consider whether there is pixel alignment between the input feature map and the output feature map, resulting in the underlying apparatus selecting whether to perform the transposed convolution operation or the bilinear interpolation operation, including selecting to perform only the transposed convolution operation when Equation 2 is met, and selecting to only perform the bilinear interpolation operation when the Equation 2 is not met. In an example, all up-samplings of decoder stage of an encoder/decoder neural network system, as a non-limiting example, may be predetermined to meet Equation 2, and accordingly in an example only the transposed convolution operation is performed and determination of the alignment of pixels may not be performed.

As explained above, because the pixels of the input feature map 310 and the pixels of the output feature map 330 are accurately aligned, a depth-wise transposed convolution layer that has a kernel size obtained by "extension ratio*2−1" and a stride parameter and a padding parameter that have a value of the extension ratio may be implemented instead of the bilinear interpolation operation.

In an example, a weight of a kernel for the transposed convolution may be generated by code described in Table 1, for example, shown below.

TABLE 1 ratio = (output_size − 1)/(input_size −1)
kernel_size =(ratio *2) −1
center = int(kernel_size/2)
weight = zeros(kernel_size, kernel_size)
  for i in range(kernel_size):
    for j in range(kernel_size):
      dis_x = abs(center-j)
      wgt_x = (center - dis_x +1) / (float(center+ 1))
      dis_y = abs(center-i)
      wgt_y = (center - dis_y +1) / (float(center+ 1))
      weight[i][j] = wgt_x*wgt_y A transposed convolution operation may also be similarly implemented instead of the alternative interpolation schemes, for example, a nearest-neighbor interpolation operation.

For example, with respect to the nearest-neighbor interpolation scheme, when an extension ratio corresponds to an even-numbered multiple, code for generating a weight of a kernel and the above-described parameters may be changed as shown in Table 2 below, for example. In this example, a kernel size may be obtained by "extension ratio+1", a stride parameter may have a value of the extension ratio, and a padding parameter may have a value obtained by "extension ratio/2".

TABLE 2 ratio = (output_size − 1)/(input_size −1)
kernel_size = (ratio+ 1)
weight = ones(kernel_size, kernel_size)

The above result is also demonstrated in the example of FIG. 4 in which an input feature map 410 has a size of "2", an extension ratio is "4", an output feature map 430 has a size of "5" and "5=2×4−[4−1]" is satisfied as in Equation 2. Thus, while an example includes the performance of the nearest-neighbor interpolation, e.g., for those up-samplings that do not satisfy Equation 2, a transposed convolution operation may be performed instead of the nearest-neighbor interpolation scheme.

Thus, with this transposed convolution operation, respective weights of a kernel multiplied by each pixel of the input feature map 410 may gradually decrease to be "0.75", "0.5", and "0.25", as a distance to a central pixel decreases. Accordingly, an influence by a pixel A on pixels neighboring the pixel A in a first line of the output feature map 430, that is, a weight of the pixel A multiplied by the neighboring pixels may gradually decrease to be "0.75", "0.5", and "0.25".

As demonstrated in FIG. 4, the pixel value of the central pixel is determined by accumulations of the kernel weight of "0.25" multiplied by each pixel of the input feature map 410, i.e., pixel A, B, C, and D. In addition, again using pixel A as an example, the influence of pixel A will further decrease for those pixels in the output feature map 430 beyond the central pixel and further away from the upper left corner of the output feature map 430, where pixel A has the greatest influence.

In an example, a size of a kernel, a stride parameter of a transposed convolution operation, and a padding parameter of the transposed convolution operation may be determined based on the extension ratio. In another example, the size of the kernel, the stride parameter of the transposed convolution operation, and the padding parameter of the transposed convolution operation may be determined based on the extension ratio and dependent on which example interpolation scheme is alternatively implemented, for example, a bilinear interpolation (BI) scheme, a nearest-neighbor interpolation scheme, a mean value interpolation scheme, or a bicubic interpolation scheme, when the transposed convolution operation is selected to not be implemented for those situations where Equation 2 is not satisfied, for example.

For example, when an input feature map includes a plurality of channels, the above-described transposed convolution operation may be independently performed for each of the channels. Thus, the image processing apparatus may generate the same number of kernels as a number of the channels of the input feature map, and may perform a depth-wise transposed convolution operation or a group transposed convolution operation between the respective kernels and each of the channels.

In an example, the weights of the kernel may be automatically generated using dedicated hardware, for example, a hardware accelerator. For example, an image processing apparatus may receive the kernel or a weight of the kernel generated by the code described above in Tables 1 and 2 from the dedicated hardware, and may use the weight to perform a transposed convolution operation.

FIGS. 5A to 5D illustrate examples of a process of performing a transposed convolution operation using a kernel 610 corresponding to channels of a first feature map 600.

FIGS. 5A to 5D illustrate results obtained by sequentially accumulating values obtained by multiplying the same kernel 610 by a scalar of the first feature map 600 as in second feature maps 620, 630, 640 and 650.

In FIGS. 5A to 5D, the first feature map 600 may have a size of 2×2, the second feature maps 620 through 650 may have a size of 8×8, and an extension ratio of the first feature map 600 may be "4". The size of the kernel 610 may be "7" obtained by the result of the formula "extension ratio×2−1", and a stride parameter and a padding parameter may be "4" equal to the extension ratio. The kernel 610 may include a weight of "1" assigned to a central pixel 619 of the kernel 610, and example weights of "0.75", "0.5" and "0.25" that are assigned to pixels neighboring the central pixel in the row and column directions are inversely proportional to a distance to the central pixel, i.e., as the distance increases the weights decrease.

Referring to FIG. 5A, a result obtained by multiplying the kernel 610 by a scalar value of "A" of a pixel 601 of the first feature map 600 is accumulated in pixels of the second feature map 620.

For example, when a central pixel 619 of the kernel 610 is allowed to correspond to an upper leftmost pixel of a block 625 of the second feature map 620, a value obtained by multiplying the scalar value of "A" of the pixel 601 by a lower right portion 611 of the kernel 610 based on the central pixel 619 of the kernel 610 may be accumulated in the block 625 of the second feature map 620.

In this example, results obtained by multiplying the scalar value of "A" of the pixel 601 by the lower right portion 611 of the kernel 610 may be calculated as, for example, A*1, A*0.75, A*0.5, and A*0.25, in response to the lower right portion 611 traversing the pixel 601, and may be accumulated sequentially from the upper leftmost pixel of the second feature map 620 as in the block 625 of the second feature map 620. The above calculating may be performed until the entire lower right portion 611 traverses the pixel 601.

Figure 5B:
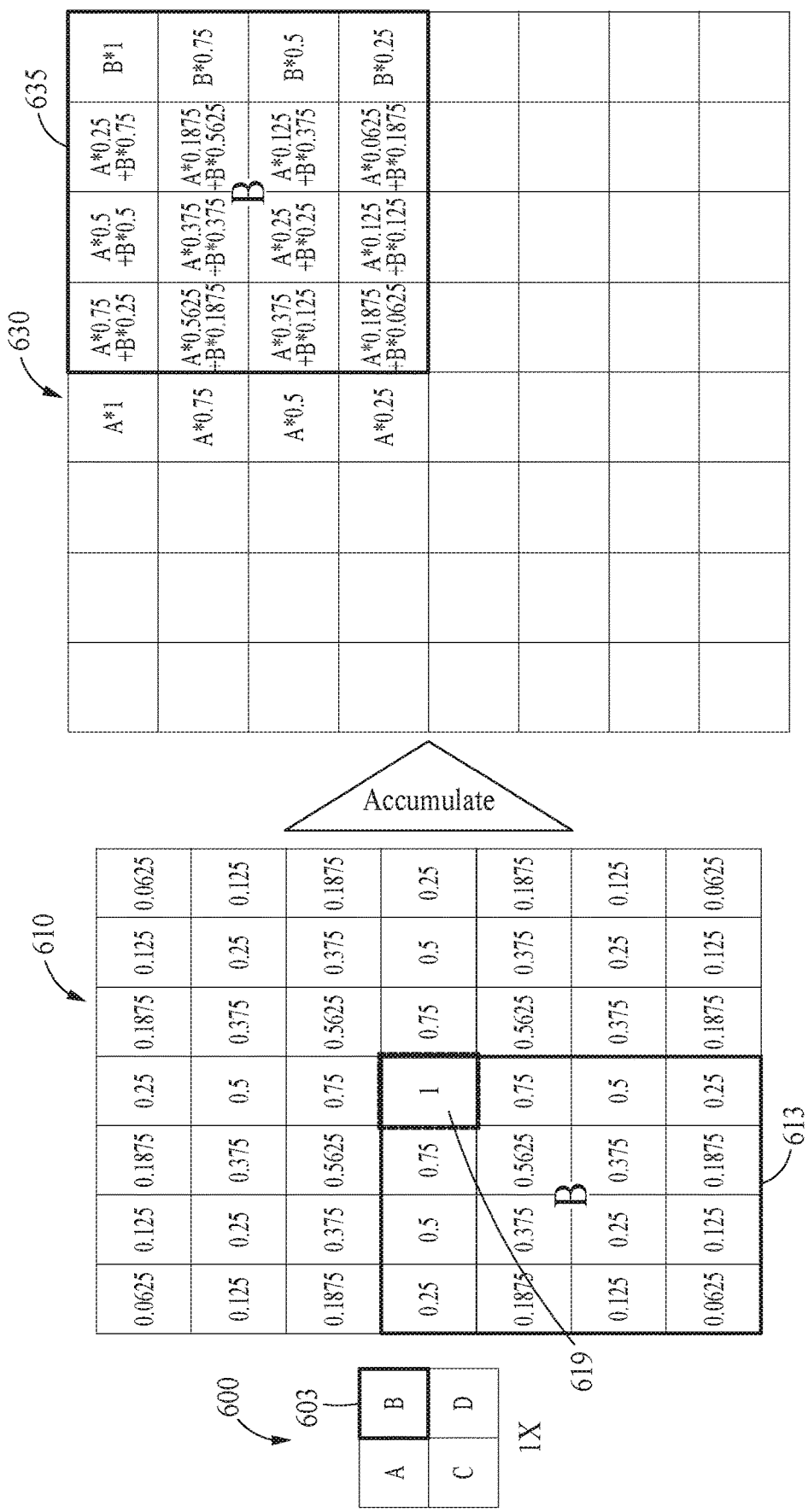

When the lower right portion 611 of the kernel 610 traverses the pixel 601 of the first feature map 600, an operation between the kernel 610 and a pixel 603 of the first feature map 600 may be performed as shown in FIG. 5B, noting that examples are not limited to such sequential performance.

Referring to FIG. 5B, a result obtained by multiplying the kernel 610 by a scalar value of "B" of the pixel 603 of the first feature map 600 is accumulated in pixels of the second feature map 630.

For example, when the central pixel 619 of the kernel 610 is allowed to correspond to an upper rightmost pixel of a block 635 of the second feature map 630, a value obtained by multiplying the scalar value of "B" of the pixel 603 by a lower left portion 613 of the kernel 610 based on the central pixel 619 may be accumulated in the block 635 of the second feature map 630.

In this example, results obtained by multiplying the scalar value of "B" of the pixel 603 by the lower left portion 613 of the kernel 610 may be calculated as, for example, B*1, B*0.75, B*0.5, and B*0.25, in response to the lower left portion 613 traversing the pixel 603. The calculated results may be accumulated sequentially from the upper rightmost pixel of the second feature map 630, and accordingly values obtained by B*1, A*0.25+B*0.75, A*0.5+B*0.5, and A*0.75+B*0.25 may be accumulated sequentially from the rightmost pixel in a first line of the block 635 of the second feature map 630. The above calculating may be performed until the entire lower left portion 613 traverses the pixel 603.

Figure 5C:
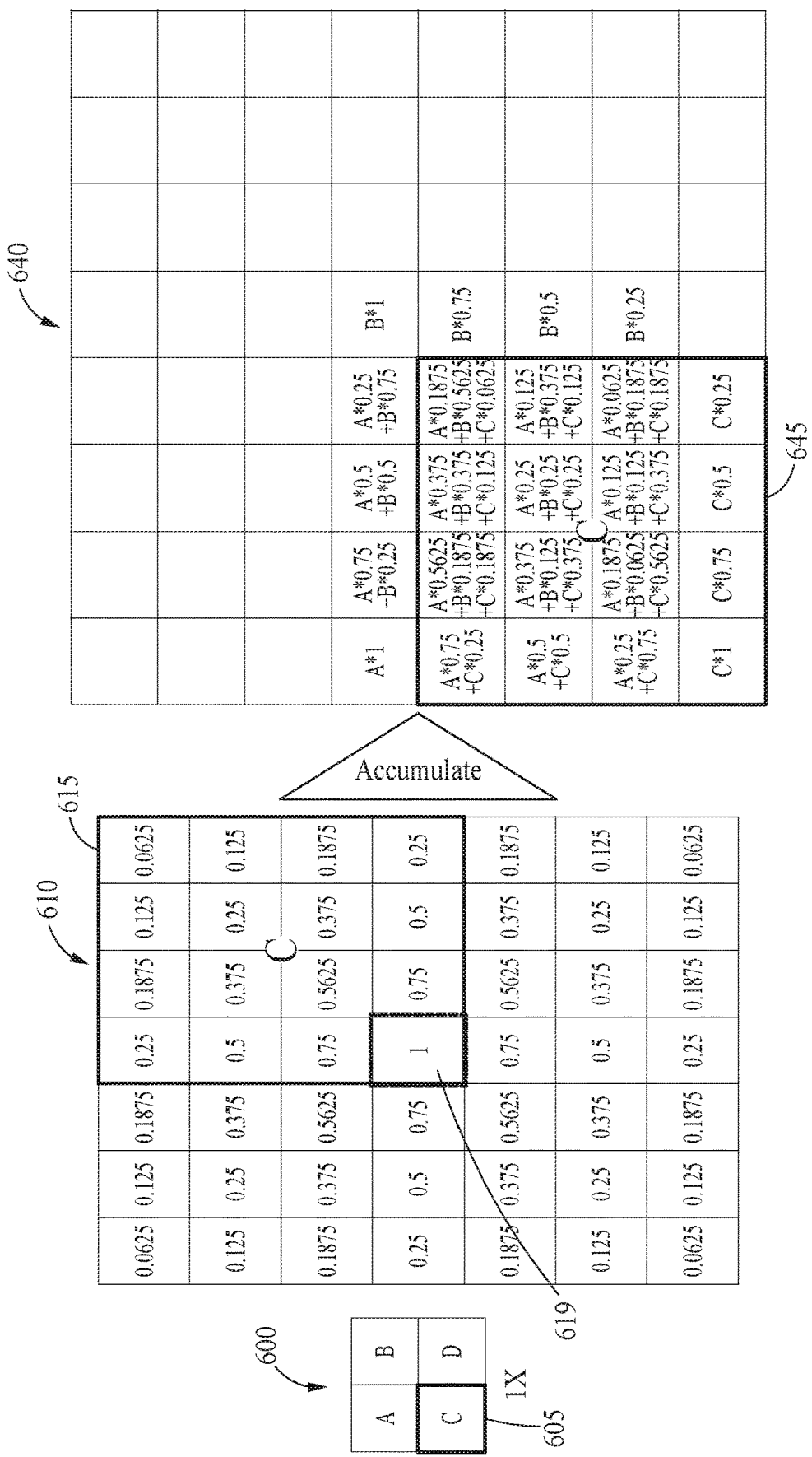

Referring to FIG. 5C, a result obtained by multiplying the kernel 610 by a scalar value of "C" of a pixel 605 of the first feature map 600 is accumulated in pixels of the second feature map 640.

For example, when the central pixel 619 of the kernel 610 is allowed to correspond to a lower leftmost pixel of a block 645 of the second feature map 640, a value obtained by multiplying the scalar value of "C" of the pixel 605 by an upper right portion 615 of the kernel 610 based on the central pixel 619 may be accumulated in the block 645 of the second feature map 640.

In this example, results obtained by multiplying the scalar value of "C" of the pixel 605 by the upper right portion 615 of the kernel 610 may be calculated as, for example, C*1, C*0.75, C*0.5, and C*0.25, in response to the upper right portion 615 traversing the pixel 605. The calculated results may be accumulated sequentially from the lower leftmost pixel of the second feature map 640, and accordingly values obtained by C*1, C*0.75, C*0.5, and C*0.25 may be accumulated sequentially from the leftmost pixel in a first line of the block 645 of the second feature map 640. The above calculating may be performed until the entire upper right portion 615 traverses the pixel 605.

Figure 5D:
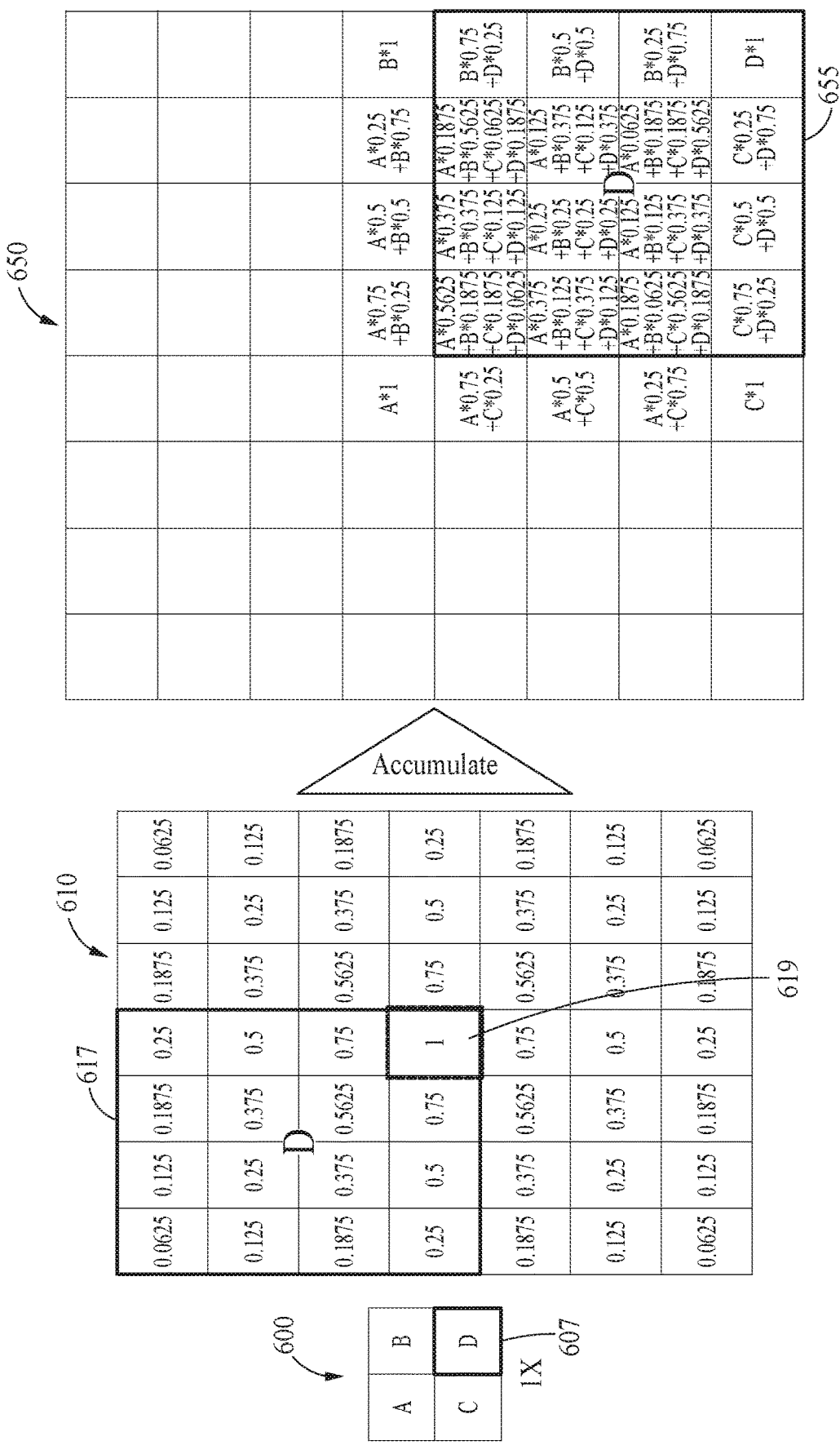

Referring to FIG. 5D, a result obtained by multiplying the kernel 610 by a scalar value of "D" of a pixel 607 of the first feature map 600 is accumulated in pixels of the second feature map 650.

For example, when the central pixel 619 of the kernel 610 is allowed to correspond to a lower rightmost pixel of a block 655 of the second feature map 650, a value obtained by multiplying the scalar value of "D" of the pixel 607 by an upper left portion 617 of the kernel 610 based on the central pixel 619 may be accumulated in the block 655 of the second feature map 650.

In this example, results obtained by multiplying the scalar value of "D" of the pixel 607 by the upper left portion 617 of the kernel 610 may be calculated as, for example, D*1, D*0.75, D*0.5, and D*0.25, in response to the upper left portion 617 traversing the pixel 607. The calculated results may be accumulated sequentially from the lower rightmost pixel of the second feature map 650, and accordingly values obtained by D*1, C*0.25+D*0.75, C*0.5+D*0.5, and C*0.75+D*0.25 may be accumulated sequentially from the rightmost pixel in a last line of the block 655 of the second feature map 650. The above calculating may be performed until the entire upper left portion 617 traverses the pixel 607.

As described above, a transposed convolution operation can be performed, instead of a bilinear interpolation operation that must typically be performed by another processor outside of hardware designed to accelerate convolutional operations or which otherwise are designed for matrix multiplication operations. When the transposed convolution operation is performed, values of an output feature map may be obtained by multiplying the kernel 610 by a scalar value of each pixel of the feature map 600 and accumulating values for each pixel of the output feature map.

Figure 6:
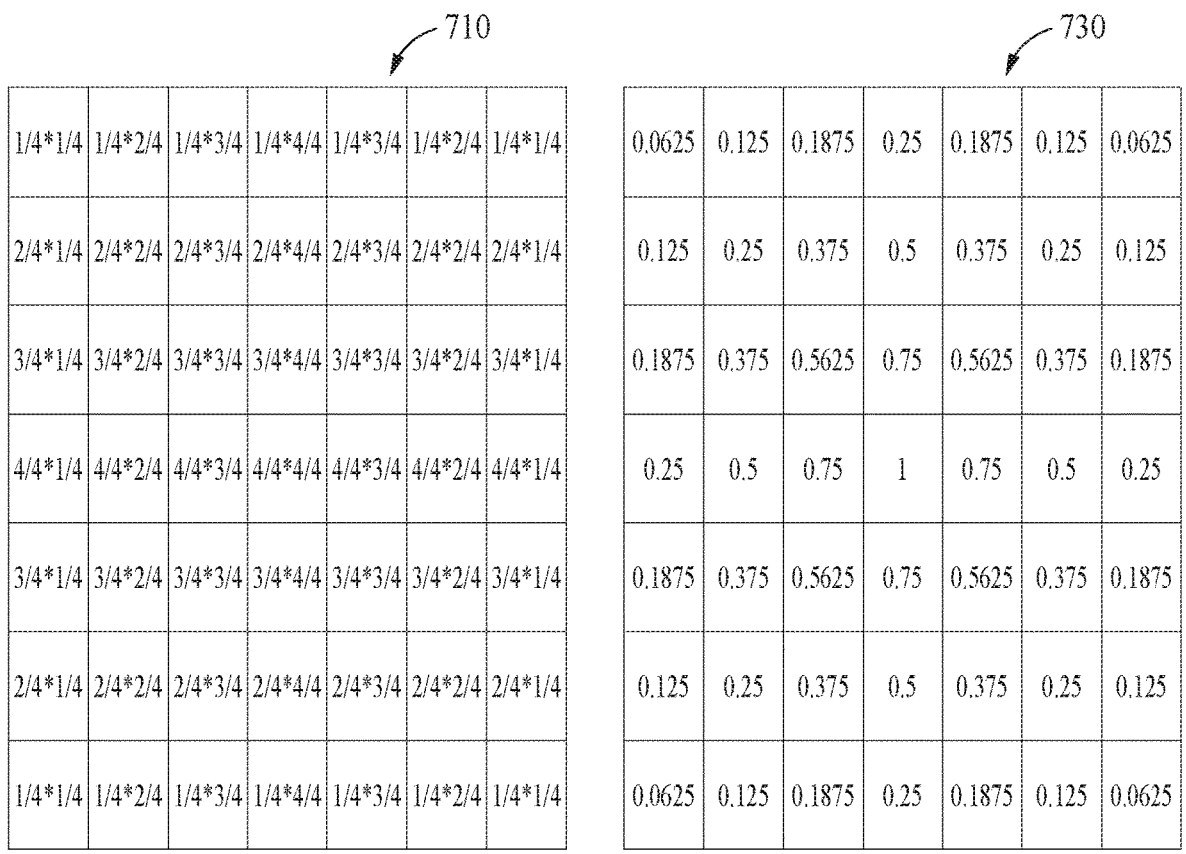
FIG. 6 illustrates examples of kernels.

FIG. 6 illustrates examples of kernels 710 and 730. FIG. 6 illustrates the kernels 710 and 730 that include weights that, in the example transposed convolution operation, traverse pixels of a first feature map, to up-sample the first feature map to a second feature map.

A size of a kernel may be determined by "extension ratio*2−1". For example, as described above with reference to FIGS. 5A to 5D, when the extension ratio is "4", the size of the kernel may be "7" obtained by "extension ratio ("4")*2−1", and accordingly the kernels 710 and 730 may have a size of 7×7.

A value (weight) included in each of the kernels 710 and 730 may include weighted and normalized values that decrease as a distance increases from a central point of each of the kernels 710 and 730. For example, when the distance between the central pixel with the 4/4*4/4 weight of the kernel 710 and neighboring pixels increases, values (weights) of the kernel 710 may decrease to 4/4*3/4, 4/4*2/4, 4/4*1/4, or 3/4*4/4, 2/4*4/4, 1/4*4/4, for example. As described above, the kernel may include weights that are inversely proportional to a distance between a central pixel of the kernel and pixels neighboring the central pixel.

When all channels are assumed to have the same kernel value, a value of each of the kernels 710 and 730 may be determined as shown in Table 3 below, for example.

TABLE 3

Python Code for 1 Channel
(Every Channel has same kernel value)

```
weight = np.zeros((kernel_size, kernel_size))
  for i in range(kernel_size):
    for j in range(kernel_size):
      dis_x = abs(center-j)
      wgt_x = (center - dis_x +1) / (float(center+1))
      dis_y = abs(center-i)
      wgt_y = (center - dis_y +1) / (float(center+1))
      weight[i][j] = wgt_x*wgt_y
```

Weights included in each of the kernels 710 and 730 may be converted into parameters through quantization, and represented as a transposed convolution kernel matrix.

Figure 7:
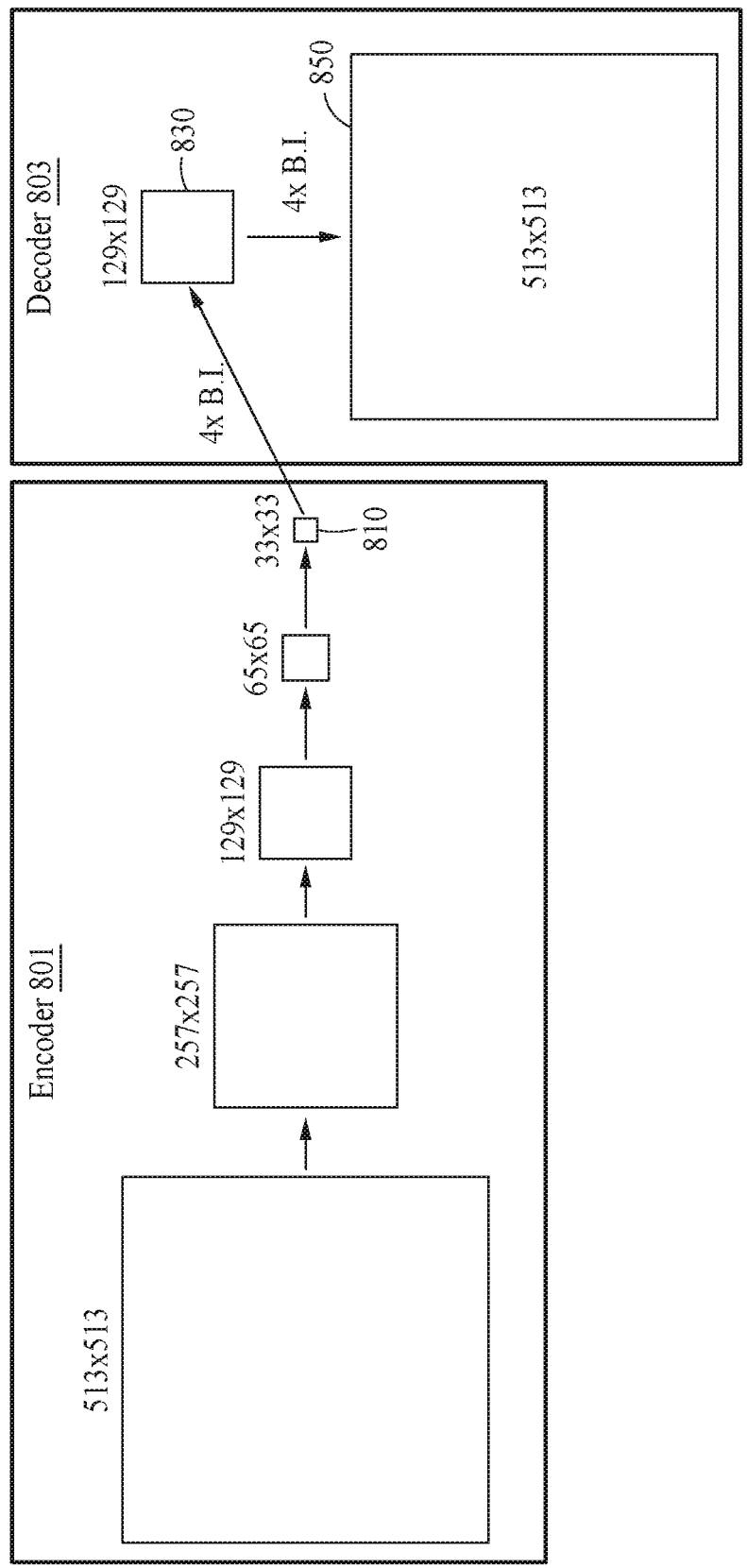
FIG. 7 illustrates an example of a process of up-sampling a first feature map output from an encoder to a second feature map to be input to a decoder.

FIG. 7 illustrates an example of a process of up-sampling a first feature map output from an example encoder to a second feature map input to an example decoder. For example, FIG. 7 illustrates an operation of each of an encoder 801 and an decoder 803.

For example, an image having an example size of 513× 513 may be input to the encoder 801. In this example, through respective convolution operations by convolutional layers of the encoder 801, information of the image having the size of 513×513 may be incrementally filtered, reduced, or compressed in a respective order of sizes of 257×257, 129×129, 65×65, and 33×33. Thus, the encoder 801 may output the feature map 810 that has the size of 33×33.

When the feature map 810 having the size of 33×33 is input to the decoder 803, the decoder 803 may up-sample the feature map 810 having the size of 33×33 to a size of the original size of the image, or another size depending on examples. In this example of FIG. 7, the decoder 803 may thus implement a first convolutional layer for the above-described transposed convolution operation to enlarge the feature map 810 having the size of 33×33 by four times to obtain a feature map 830 having a size of 129×129, and may then implement a second convolutional layer operation of the above-described transposed convolution operation to enlarge the feature map 830 having the size of 129×129 by four times to obtain a feature map 850 having a size of 513×513. Here, while the up-sampling to generate the feature map 830, and the up-sampling to generate the feature map 850 could both also be performed by the aforementioned bilinear interpolation, as discussed below because each up-sampling satisfies Equation 2, a transposed convolution operation can be performed instead.

In this example, the feature map 810 resulting from the sequential implementation of multiple convolutional neural network layers, or other neural network operations, that filter, reduce, or compress information of the original image may ultimately have the size of 33×33. However, a neural network layer of the decoder 803 may up-sample the input feature map 810 to the feature map 830 having the size of 129×129, where the extension ratio may be "4". For example, Equation 2 is satisfied because "129" may be obtained by "33*4−(4−1)", and thus the neural network layer of decoder 803 may implement the above-described transposed convolution operation to up-sample the feature map 810 of 33×33 to the feature map 830 of 129×129, e.g., instead of performing a bilinear interpolation (BI) operation that typically would need to be performed outside of the decoder 802 by another processor to interpolate the feature map 830 from the input feature map 810.

Also, the feature map 830 having been obtained by the up-sampling through the transposed convolution operation in the previous layer in the neural network of the decoder 803 may have the size of 129×129, and an additional neural network layer of the decoder may perform up-sampling of the feature map 830 through another transposed convolution operation to generate the feature map 850, e.g., to be finally output by the decoder 803, with the size of 513×513, where the extension ratio may be "4". For example, Equation 2 is satisfied because "513" may be obtained by "129*4−(4−1)", and thus the additional neural network layer of decoder 803 may implement the above-described transposed convolution operation to up-sample the feature map 830 of 129×129 to the feature map 850 of 513×513, e.g., instead of performing a bilinear interpolation operation that typically would need to be performed outside of the decoder 802 by another processor to interpolate the feature map 850 from the feature map 830. In an example, the decoder 803 may up-sample the feature map 830 having the size of 129×129 to the feature map 850 having the size of 513×513 by performing a depth-wise transposed convolution operation In an example, an image processing method may include an example in which a feature map, e.g., reduced in size by one or more convolutional operations, may be enlarged using a CNN, as discussed above. The image processing method may also, or alternatively, include an increasing of a size of a feature map from 1×1 to a feature map of 33×33 and a copying of the feature map of 33×33 to a memory. For the operation of the copying of such a feature map 33×33 to the memory, an example image processing apparatus may use a 33×33 kernel that is filled using weights of "1", and by implementing a depth-wise transposed convolution operation of the 1×1 feature map with the 33×33 kernel the image processing apparatus may store the resulting 33×33 feature map to the memory.

Figure 8:
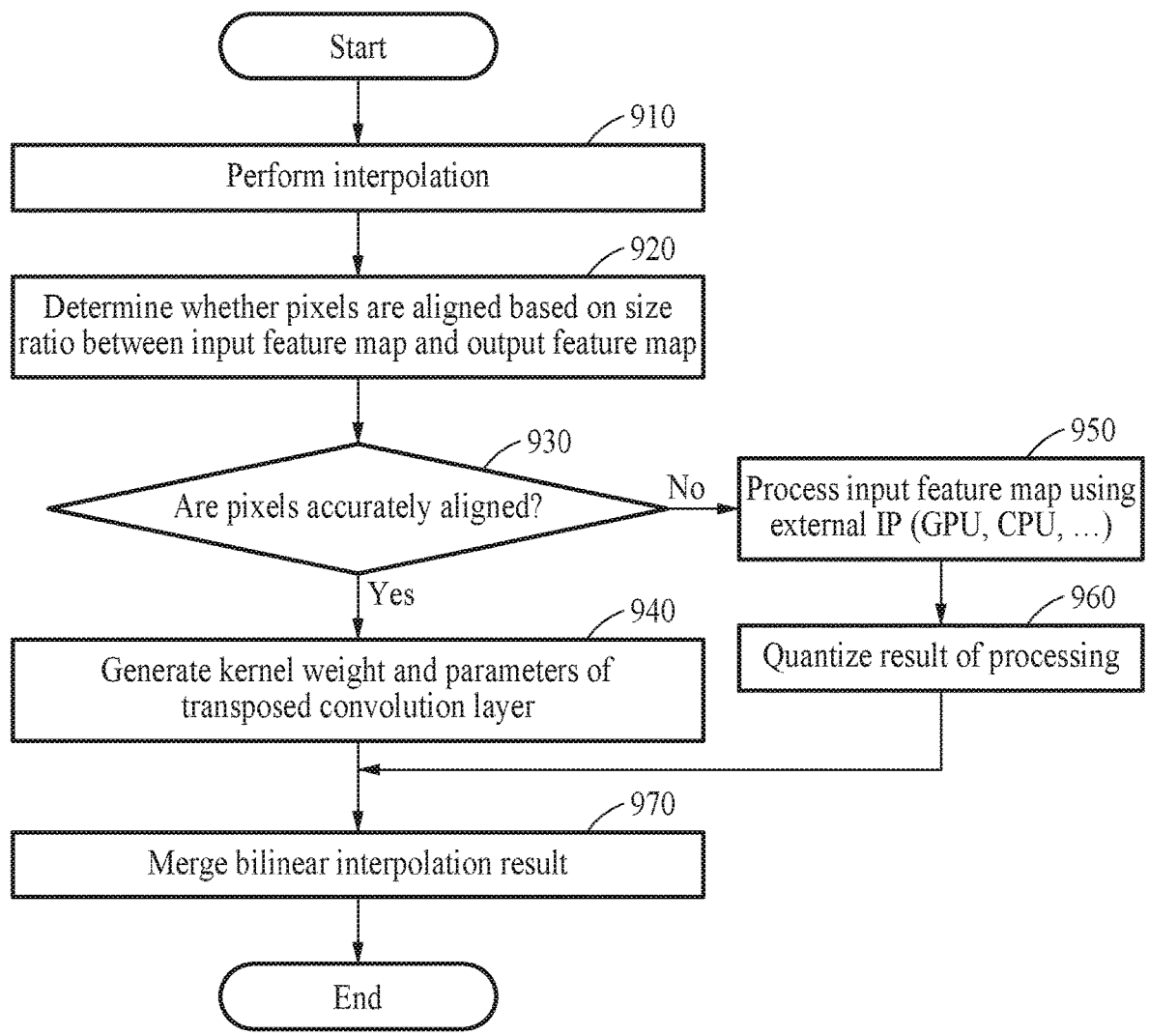
FIG. 8 illustrates an example of a process in which an apparatus generates an execution file to allow an image processing apparatus to up-sample a first feature map to a second feature map.

FIG. 8 illustrates an example of a process in which an apparatus, e.g., a server or other device that includes one or more processors and a neuro processing unit (NPU) or accelerator, as non-limiting examples, generates an execution file to allow or implement an up-sampling of a first feature map to a second feature map. In one example, the example server may generate such an execution file for a separate image processing apparatus, for example. Alternatively, the image processing apparatus may generate the execution file. Referring to FIG. 8, in operation 910, the apparatus may initiate the performance of an interpolation operation on an input feature map, for generating an output feature map by up-sampling the input feature map. The input feature map may correspond to any of the above-described input or first feature maps, and the output feature map may correspond to any of the above-described output or second feature maps.

In operation 920, the apparatus determines an alignment of the input feature map and the output feature map based on a size ratio between the input feature map and the output feature map. In operation 920, when the size ratio between the input feature map and the output feature map satisfies Equation 2 described above, pixels of the input feature map and pixels of the output feature map may be accurately aligned.

For example, in operation 930, the apparatus determines whether the pixels are accurately aligned based on the result of operation 920. When the pixels are determined to be accurately aligned in operation 930, the apparatus performs operation 940. In operation 940, the apparatus may generate or obtain a kernel with weights and kernel parameters for a neural network layer and perform a transposed convolution operation using the neural network layer provided the input feature map to up-sample the first feature map to the second feature map. The neural network layer may include the kernel parameters, for example, the kernel size, a stride parameter of/for the kernel, and/or a padding parameter. Accordingly, in an example, an up-sampled output feature map may be generated without having to perform the traditional bilinear interpolation operation using an external IP of the apparatus. Thus, the apparatus may selectively perform one of the transposed convolution operation and the bilinear interpolation based on whether the pixels are determined to be accurately aligned.

In an example, when the pixels are determined to be accurately aligned in operation 930, the apparatus may perform the up-sampling using a depth-wise transposed convolution layer that has a kernel size obtained accord to the equation of "extension ratio*2−1" and a stride parameter and a padding parameter that have a value of the extension ratio, for example. The depth-wise transposed convolution layer may be performed by an NPU or other hardware accelerator of the apparatus, for example.

For example, the apparatus may generate weights of a kernel as shown in Table 1 above, and may generate and implement a depth-wise transposed convolution layer to generate the up-sampled output feature map. In an example, the up-sampled output feature map may be the same as a result would have been if a bilinear interpolation operation were performed with respect to the input feature map.

In another example, when the pixels are determined to be inaccurately aligned in operation 930, the apparatus may process the input feature map using the external IP of the apparatus in operation 950. For example, in operation 950, the apparatus may up-sample the input feature map to the output feature map by performing a bilinear interpolation operation on the input feature map. In this example, the external IP may include, for example, a GPU and/or a CPU, that are executed to up-sample the input feature map to the output feature map through a bilinear interpolation operation including a floating point operation. Here, though an example is provided where the bilinear interpolation is selectively performed, alternative examples include the nearest-neighbor interpolation scheme, a mean value interpolation scheme, or a bicubic interpolation scheme being implemented alternatively to the bilinear interpolation in operation 950.

In operation 960, the apparatus may quantize a result of the up-sampling in operation 950. The apparatus may quantize a result of the bilinear interpolation operation including a real number through a floating point operation, for example, so that the result may be merged in operation 970.

In operation 970, the apparatus may merge information that is generated in operation 940, with a value that may be obtained by quantizing the result of the bilinear interpolation operation in operation 960. In operation 970, a server example may generate an execution file to allow an image processing apparatus, for example, to up-sample the input feature map to the output feature map, by the merging, and may transfer the execution file to the image processing apparatus. The execution file may have, for example, a form of binary executable code including a predefined kernel.

When the execution file is received from the server, the image processing apparatus may include a kernel deterministically defined based on the size ratio between the input feature map and the output feature map, a weight of the kernel, a stride parameter, and a padding parameter.

In an example, a the image processing apparatus may be configured to implement a neural network, such as the neural network encoder/decoder system discussed with respect to FIG. 7, and may control the implementation of a forward inference operation of a trained objective of the neural network according to trained parameters of the neural network and based on an extension ratio of a first feature map, e.g., a feature map generated by the neural network for an input or captured image, or where the first feature map is the input or captured image. Thus, in this example, the image processing apparatus (for example, a user terminal such as a smartphone), may perform the forward inference operation that includes, e.g., prior to a generation or indication of a result of the forward inference operation, the up-sampling of the first feature map in a neural processing unit or accelerator of the image processing apparatus.

Figure 9:
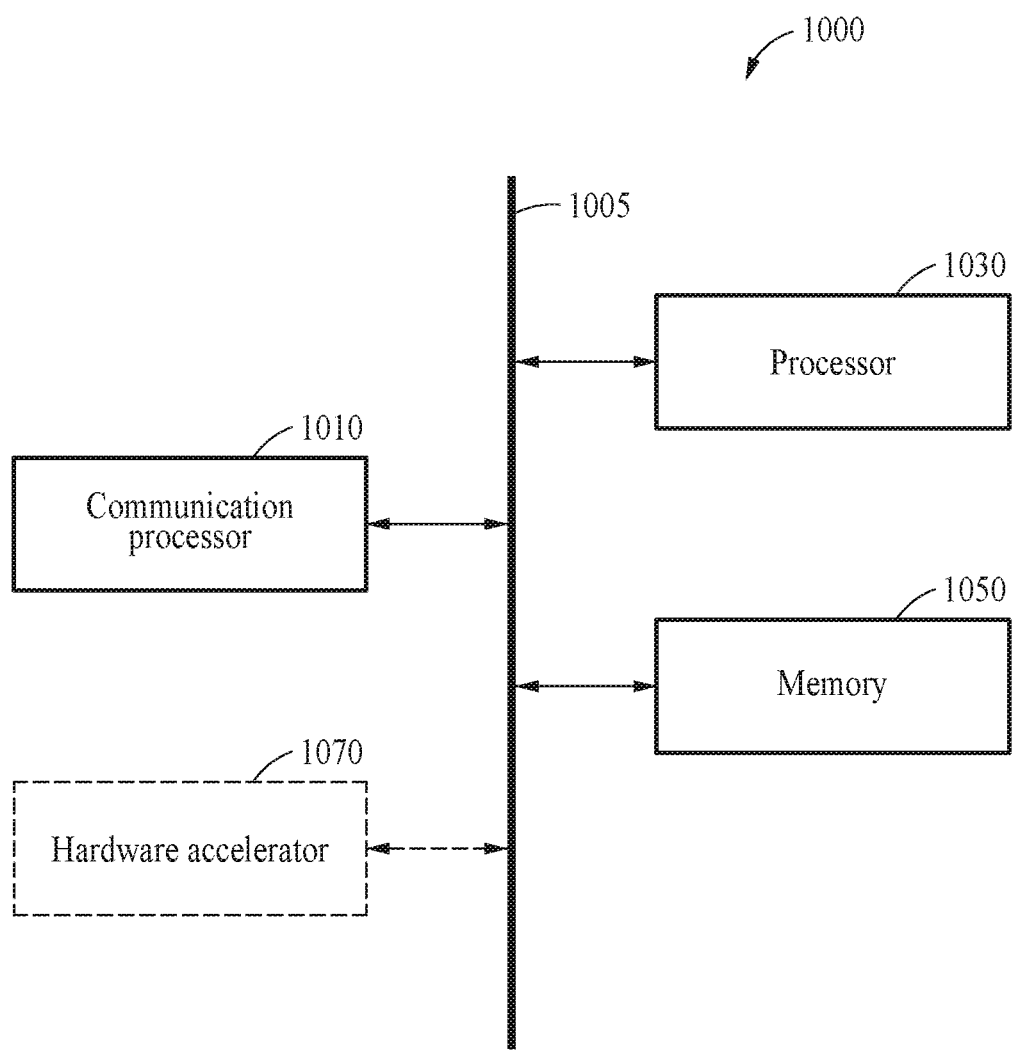
FIG. 9 illustrates an example of an image processing apparatus.

FIG. 9 illustrates an example of an image processing apparatus 1000. Referring to FIG. 9, the image processing apparatus 1000 includes a communication interface 1010, and a processor 1030. The image processing apparatus 1000 may further include a memory 1050, and a hardware accelerator 1070. The communication interface 1010, the processor 1030, the memory 1050 and the hardware accelerator 1070 may be connected to each other via a communication bus 1005.

The communication interface 1010 may receive a first feature map. The first feature map may be, for example, a feature map obtained by compressing information of an original image through a convolution operation in a previous layer of a neural network, or a feature map that is up-sampled through a transposed convolution operation in the previous layer of the neural network, but is not limited thereto. The first feature map may include quantized activation values. Also, the communication interface 1010 may output a second feature map obtained by up-sampling the first feature map by the processor 1030.

The processor 1030 represents multiple processors, such as a microprocessor, a CPU, a GPU, a processor core, a multi-core processor, a multiprocessor, etc., configured to control operations of the image processing apparatus 1000, such as applications and other instructions stored in the memory 1050. The processor 1030 is further representative of another processor, such as a neural processing unit (NPU), which may be configured for convolutional operations using multiply and accumulate (MAC) operations, which may obtain a kernel that is deterministically defined based on an extension ratio of the first feature map. For example, the kernel may include weights that are inversely proportional to a distance between a central pixel of the kernel and pixels neighboring the central pixel. The kernel may include quantized weights. For example, the neuro processing unit may up-sample the first feature map to the second feature map by performing a transposed convolution operation between the first feature map and the kernel. The neuro processing unit may further be configured to perform one or more convolution operations for a captured image to extract the first feature map of a lesser size than the captured image, and the neuro processing unit may perform the up-sampling of the first feature map within the neuro processing unit without the image processing device 1000 using an external information provider (IP), for example, the GPU or the CPU to perform bilinear interpolation to generate the up-sampled feature map.

Accordingly, the processor 1030 may perform one or more or all operations and methods described above with reference to FIGS. 1 through 8. The processor 1030 may be a hardware-implemented data processing device having a circuit that is physically structured to execute desired operations. For example, the desired operations may include code or instructions included in software. The hardware-implemented data processing device may include, for example, the microprocessor, the CPU, the GPU, the processor core, the multi-core processor, the multiprocessor, an application-specific integrated circuit (ASIC), a field-programmable gate array (FPGA), and the neural processing unit (NPU).

The processor 1030 may also execute instructions, stored in memory 1050, to control the image processing apparatus 1000

The memory 1050 may store the first feature map received by the communication interface 1010, and/or the second feature map output by the processor 1030. Also, the memory 1050 may store the kernel, a variety of information (for example, a size or a weight of the kernel) associated with the kernel, and/or parameters (for example, a stride parameter of a transposed convolution operation and a padding parameter of a transposed convolution operation) of a neural network layer, as well as all remaining trained parameters of the neural network for the trained objective of the inference operation of the neural network.

As described above, the memory 1050 may store a variety of information generated in a processing process of the processor 1030. Also, the memory 1050 may store a variety of data and programs. The memory 1050 may include, for example, a volatile memory or a non-volatile memory. The memory 1050 includes a large-capacity storage medium such as a hard disk to store a variety of data.

The hardware accelerator 1070 may dynamically generate the kernel based on the extension ratio of the first feature map. Depending on examples, the hardware accelerator 1070 may select one kernel from a plurality of pre-generated kernels, based on the extension ratio of the first feature map, instead of dynamically generating the kernel.

The image processing apparatus 1000 may include, but is not limited to, for example, a head-up display (HUD) device, a 3D digital information display (DID), a navigation device, a 3D mobile device, a smartphone, a smart television (TV), and a smart vehicle. The 3D mobile device may be construed to include a head-mounted display (HMD), a face-mounted display (FMD), or a display device to display, for example, augmented reality (AR), virtual reality (VR) or mixed reality (MR).

The apparatuses, the server, the image processing apparatus 1000, the communication processor 1010, the processor 1030, the memory 1050, the hardware accelerator 1070, the communication bus 1005, encoder 801, decoder 803, the neural processing unit (NPU), and other apparatuses, units, modules, devices, and other components described herein with respect to FIGS. 1-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 9 that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An image processing method comprising:
   obtaining kernel values of a kernel, where distributed positions of same kernel values in the kernel are based on an extension ratio;
   up-sampling a first feature map to a second feature map; and
   outputting the second feature map,
   wherein the extension ratio is a ratio between a size of the second feature map and a size of the first feature map, and
   wherein the up-sampling of the first feature map includes selectively, based on whether the size of the second feature map matches a predetermined formulation that is dependent on at least on of the size of the first feature map or the extension ratio, performing one between an interpolation operation and a transposed convolution operation to up-sample the first feature map, where the transposed convolution is between the first feature map and the kernel.

2. The method of claim 1, wherein the outputting of the second feature map includes inputting the second feature map to a neural network layer configured to perform another transposed convolution operation between the second feature map and a select kernel that is generated based on an extension ratio of the second feature map.

3. The method of claim 1, wherein the image processing method is a method of an image processing device that includes a neuro processing unit that performs the up-sampling of the first feature map to the second feature map without performing the interpolation operation using an external information provider.

4. The method of claim 1, wherein the kernel comprises weights that vary dependent on a distance between a central pixel of the kernel and pixels neighboring the central pixel.

5. The method of claim 4, wherein values of the weights are inversely proportional to the distance between the central pixel and the neighboring pixels.

6. The method of claim 1, wherein the kernel has a size that is greater than the size of the first feature map.

7. The method of claim 1, wherein a size of the kernel, a stride parameter of the transposed convolution operation, and a padding parameter of the transposed convolution operation are determined based on the extension ratio.

8. The method of claim 7,
   wherein the size of the kernel, the stride parameter of the transposed convolution operation, and the padding parameter are kernel parameters, and
   wherein the performing of the transposed convolution operation includes performing the transposed convolution operation using a neural network layer configured according to the kernel parameters and input the first feature map.

9. The method of claim 7, wherein the size of the kernel, the stride parameter of the transposed convolution operation, and the padding parameter of the transposed convolution operation are determined based on an interpolation scheme in addition to the extension ratio.

10. The method of claim 9, wherein the method further comprises, at a different time than a time of the selective performing of the one between the interpolation operation and the transposed convolution operation, another selectively performing between one of:
a first generating of another second feature map by performing another transposed convolution operation based on another kernel to generate the other second feature map from another first feature map, where distributed positions of same kernel values in the other kernel are based on another extension ratio; and
a second generating of the other second feature map by interpolating, according to the interpolation scheme, the other second feature map from the other first feature map using an external information provider.

11. The method of claim 1, wherein pixel alignment information of another second feature map is predetermined,
wherein the method further comprises determining whether there will be pixel alignment between another first feature map and the other second feature map based on the pixel alignment information of the other second feature map, and
the method further comprises, dependent on a result of the determining of whether there will be pixel alignment, another selectively performing, at a different time than a time than a time of the selective performing of the one between the interpolation operation and the transposed convolution operation, between one of:
a first generating of the other second feature map by performing another transposed convolution to generate the other second feature map from the other first feature map based on another kernel, where distributed positions of same kernel values in the other kernel are based on another extension ratio; and
a second generating of the other second feature map by interpolating, according to an interpolation scheme, the other second feature map from the other first feature map using an external information provider.

12. The method of claim 1, wherein the first feature map comprises a plurality of channels, and the transposed convolution operation is a depth-wise transposed convolution operation between the channels and the kernel.

13. The method of claim 1, wherein
the first feature map comprises quantized activation values, and
the kernel comprises quantized weights.

14. The method of claim 1, wherein the kernel comprises a transposed convolution kernel matrix obtained by converting a weight multiplied by a first value of a first pixel of the first feature map into a parameter through a quantization, to convert the first value into a second value of a second pixel of the second feature map corresponding to a position of the first pixel.

15. The method of claim 1, wherein the extension ratio is determined so that the size of the first feature map and the size of the second feature map satisfy a predetermined integer ratio.

16. The method of claim 1, wherein the first feature map is an output feature map of a previous convolutional neural network layer in a neural network that is input an original image, or an output up-sampled feature map of a transposed convolution neural network layer in the previous layer in the neural network.

17. A non-transitory computer-readable storage medium storing instructions that, when executed by a processor, cause the processor to perform the method of claim 1.

18. An image processing apparatus comprising:
one or more processors configured to:
obtain kernel values of a kernel, where distributed positions of same kernel values in the kernel are based on an extension ratio; and
up-sample a first feature map to a second feature map, wherein the extension ratio is a ratio between a size of the second feature map and a size of the first feature map, and
wherein the up-sampling of the first feature map includes a selective, based on whether the size of the second feature map matches a predetermined formulation that is dependent on at least one of the size of the first feature map or the extension ratio, performance of one between an interpolation operation and a transposed convolution operation to up-sample the first feature map, where the transposed convolution operation is between the first feature map and the kernel.

19. The apparatus of claim 18, wherein the one or more processors are configured to perform the transposed convolution operation using a neural network layer, configured according the kernel and kernel parameters, input the first feature map.

20. The apparatus of claim 19, wherein the kernel parameters include a size of the kernel, a stride parameter of the transposed convolution operation, and a padding parameter.

21. The apparatus of claim 18, wherein the one or more processors include a neural processing unit configured to perform the up-sampling of the first feature map to the second feature map without performing the interpolation operation using an external information provider.

22. The apparatus of claim 18, wherein the kernel comprises weights that vary dependent on a distance between a central pixel of the kernel and pixels neighboring the central pixel.

23. The apparatus of claim 22, wherein the weights are inversely proportional to the distance between the central pixel and the neighboring pixels.

24. The apparatus of claim 18, wherein the kernel has a size greater than the first feature map.

25. The apparatus of claim 18, wherein a size of the kernel, a stride parameter of the transposed convolution operation, and a padding parameter of the transposed convolution operation are determined based on the extension ratio.

26. The apparatus of claim 25, wherein the size of the kernel, the stride parameter of the transposed convolution operation, and the padding parameter are kernel parameters, and
wherein the one or more processors are configured to perform the transposed convolution operation using a neural network layer configured according to the kernel parameters and input the first feature map.

27. The apparatus of claim 25, wherein the size of the kernel, the stride parameter of the transposed convolution operation, and the padding parameter of the transposed convolution operation are determined based on an interpolation scheme in addition to the extension ratio.

28. The apparatus of claim 18, wherein pixel alignment information of the second feature map is predetermined,
the one or more processors are further configured to:
determine whether there will be pixel alignment between the first feature map and the second feature map based on the pixel alignment information of the second feature map, and dependent on a result of the determining of whether there will be pixel alignment, the one or more processors perform the transposed convolution using a neural network layer, or perform interpolation according to the interpolation scheme to generate the second feature map.

29. The apparatus of claim 18, wherein the first feature map comprises a plurality of channels, and the transposed convolution operation is a depth-wise transposed convolution operation between the channels and the kernel.

30. The apparatus of claim 18, wherein
the first feature map comprises quantized activation values, and
the kernel comprises quantized weights.

31. The apparatus of claim 18, wherein the kernel comprises a transposed convolution kernel matrix obtained by converting a weight multiplied by a first value of a first pixel of the first feature map into a parameter through a quantization, to convert the first value into a second value of a second pixel of the second feature map corresponding to a position of the first pixel.

32. The apparatus of claim 18, wherein the extension ratio is determined so that a size of the first feature map and a size of the second feature map satisfy a predetermined integer ratio.

33. The apparatus of claim 18, wherein the first feature map is an output feature map of a previous convolutional neural network layer in a neural network that is input an original image, or an output up-sampled feature map of a transposed convolution neural network layer in the previous layer in the neural network.

34. The apparatus of claim 18, further comprising:
a hardware accelerator configured to dynamically generate the kernel based on the extension ratio.

35. The apparatus of claim 18, wherein the image processing apparatus is a head-up display (HUD) device, a three-dimensional (3D) digital information display (DID), a navigation device, a 3D mobile device, a smartphone, a smart television (TV), or a smart vehicle.

36. An apparatus comprising:
one or more processors, including a CPU, a GPU, and neuro processor,
wherein the neural processor is configured to:
implement a neural network through respective performances of plural convolutional layers;
obtain kernel values of a kernel, where distributed positions of same kernel values in the kernel are based on an extension ratio of a first feature map generated by one of the plural convolutional layers; and
up-sample a first feature map to a second feature map,
wherein the extension ratio is a ratio between a size of the second feature map and a size of the first feature map, and
wherein the up-sampling of the first feature map includes a selective, based on whether the size of the second feature map matches a predetermined formulation that is dependent on at least one of the size of the first feature map or the extension ratio, performance of one between an interpolation operation and a transposed convolution operation to up-sample the first feature map, where the transposed convolution operation is between the first feature map and the kernel.

37. The apparatus of claim 36, further comprising a hardware accelerator configured to dynamically generate the kernel, based on the extension ratio, and provide the kernel to the neural processor.

38. The apparatus of claim 36, wherein the neural network includes a neural network layer that is input the second feature map.

39. The method of claim 1, wherein the kernel is dynamically generated by an accelerator based on a size of the first feature map.

40. The apparatus of claim 36, wherein the generating of the kernel values is performed during an inference operation or after training of the neural network.

41. The apparatus of claim 36, wherein the predetermined formulation is dependent on the size of the first feature map and the extension ratio, and
wherein, for the selective performance of the one between the interpolation operation and the transposed convolution operation, the neural processor is configured to:
perform the transposed convolution operation when the predetermined formulation matches the size of the second feature map; and
perform the interpolation operation when the predetermined formulation does not match the size of the second feature map.

42. The apparatus of claim 41, wherein the interpolation operation is a bilinear interpolation.

* * * * *